UNITED STATES PATENT OFFICE.

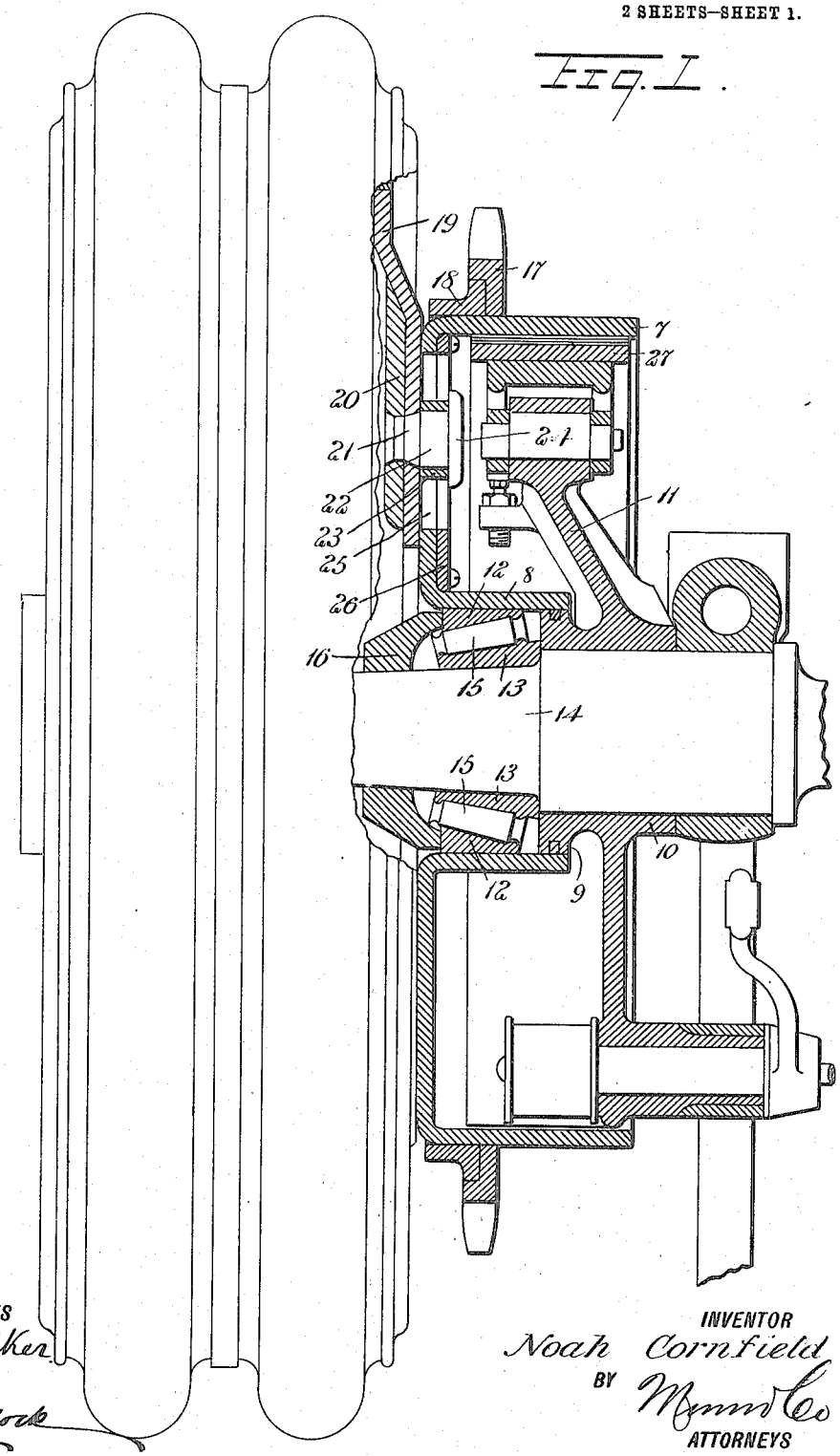

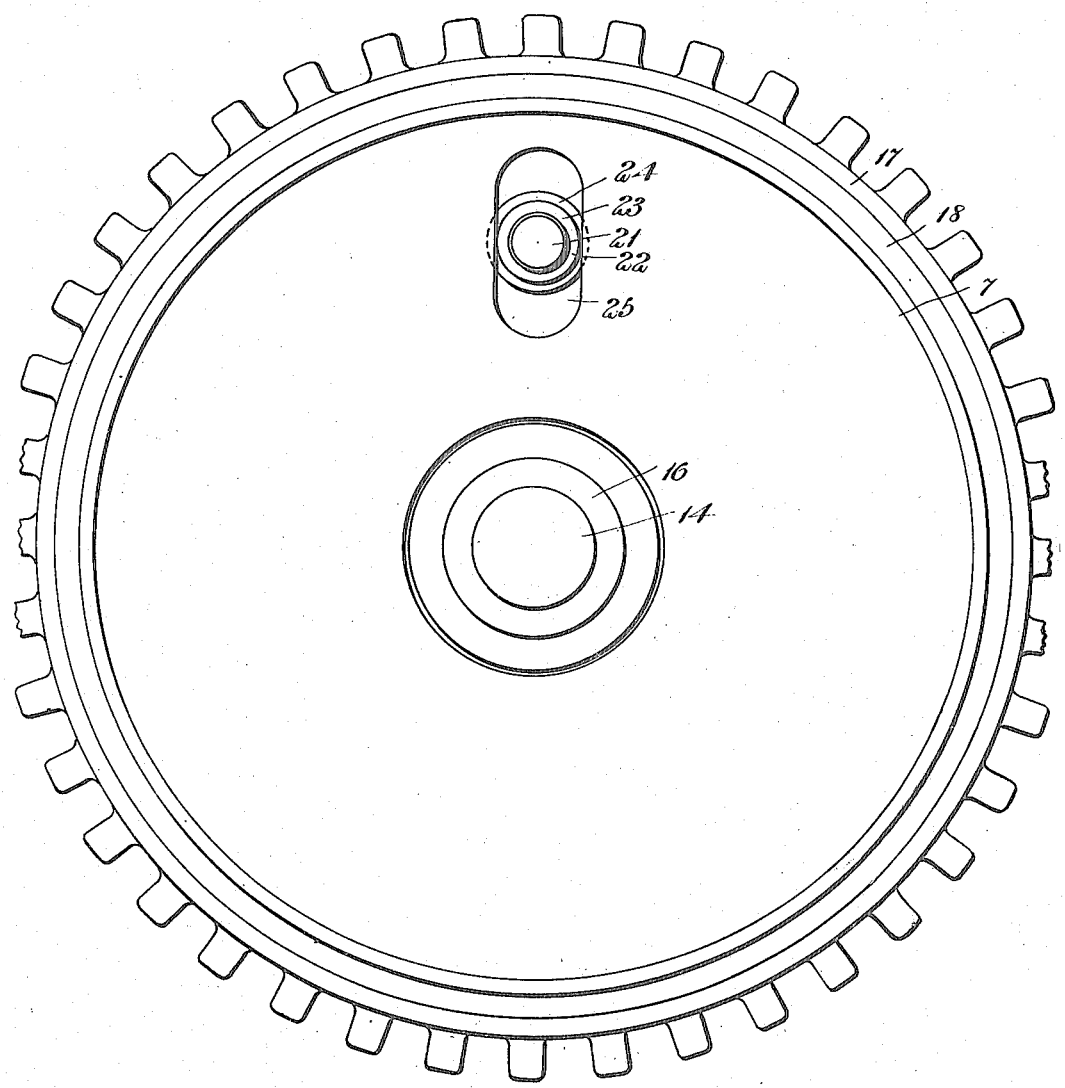

NOAH CORNFIELD, OF NEW YORK, N. Y.

BRAKE-DRUM FOR VEHICLE-WHEELS.

1,135,770.

Specification of Letters Patent.

Patented Apr. 13, 1915.

Application filed March 9, 1914. Serial No. 823,537.

*To all whom it may concern:*

Be it known that I, NOAH CORNFIELD, a citizen of the United States, and a resident of the city of New York, borough of Brooklyn, in the county of Kings and State of New York, have invented a new and Improved Brake-Drum for Vehicle-Wheels, of which the following is a full, clear, and exact description.

Among the principal objects which the present invention has in view are: to provide a drum of the character mentioned, with a flexible connection between said drum and the vehicle driving wheel; to provide a drum of the character mentioned with a suitable driving sprocket wheel; and to provide a yielding connection for said wheel with said drum.

In the drawings, Figure 1 is a horizontal section of the drum and a part of a driving wheel connected therewith; Fig. 2 is a face view of said drum, showing a driving sprocket, a connecting pin, and a slot for guiding said pin.

As seen in the accompanying drawings, the drum 7 is cup-shaped, having an end opening away from the wheel to which said drum is attached, and a central passage formed by an upstanding annular flange 8. The passage formed by the flange 8 is trued to fit snugly the edge 9 with which the hub 10 of a brake bracket 11 is provided. Frictionally engaging the side wall of said passage is an internally coned seat ring 12. A somewhat slightly less coned seat ring 13 is fitted upon a rounded portion 14 of the wheel axle. Between the rings 13 and 14 are slightly coned rollers 15, the axes of said rollers being radiated from a common center, or disposed in relatively conical arrangement. The axle intermediate the hub of the wheel and the ring 12 is a cupped washer 16. The washer 16 bears against the outer edge of the ring 12, the object being to retain said ring in service position. Rigidly mounted upon the drum 7 is a sprocket toothed ring 17, adapted for engagement by a power transmission driving chain, usual in power-driven vehicles. The ring 17 is reinforced by a flange ring 18 rigidly mounted on the drum 7, as best seen in Fig. 1 of the drawings. When adapting a drum of the character described to a driving wheel, an extra heavy plate 19 is mounted upon the wheel, and a reinforcing member 20 is mounted thereon and bored to receive the tapered end 21 of a pin 22. The pin 22 is trued to operate as a bearing for a roller collar 23, over the edges of which the flange or head 24 formed on said pin, extends. To receive the pin 22 and its collar 23, a slot 25 is formed in the vertical wall of the drum 7, and in a reinforcing wear strip 26, which is mounted upon said drum, within the cup thereof. The combined thicknesses of the wall of the drum and the wear strip 26 form a wearing edge of the slot 25 for the collar 23 to roll upon. The tapered end 21 of the pin 22, when inserted in the perforation provided for it in the plate 19 and reinforcing member 20, is headed or riveted. When operating, the pull of the drum 7 and the driving mechanism connected therewith, is imparted thereby to the driving wheel of the vehicle through said pin 22 and the collar 23 mounted thereon.

As set forth in the application for patent filed by me under date of March 9, 1914, for improvements in vehicle wheels, No. 823,538, there is disclosed a construction and arrangement whereby the vibration of the wheel is independent of the axle on which it is mounted, and consequently, in this connection, is independent of the vibration of the drum 7. Also, mention is therein made of the fact that, with the loading of a vehicle having a wheel constructed as therein described, the center of the wheel and the center of the axle may not coincide, due to the relative depression of the center of the axle. As will be seen, such a construction requires a sliding connection between the rotary driven drum 7 and the wheel driven thereby. This sliding connection is formed by the pin 22 mounted in the slot 25. With a connection such as herein described, using the pin 22 fixedly mounted in the plate 19 of the vehicle wheel, and the slot 25 formed in the wall of the drum 7, the point of engagement between the two members may relatively shift lengthwise in said slot, as the drum and wheel rotate together. The brake band 27 shown in the drawings and parts connected therewith are of conventional form, and operate to force said band into gripping relation with the under surface of said drum.

Claims.

1. In combination; a carrying wheel having a hub and flexible connections therewith; an axle held against rotation; a brake drum continuously concentric with and rotatively mounted on said axle an operative connection for said drum and said wheel, embodying a driving pin rigidly mounted in one of said members, and a slot to receive said pin, formed in the other of said members, said slot being radial to said members.

2. In combination; a carrying wheel having a hub and flexible connections therewith; an axle held against rotation; a brake drum continuously concentric with and rotatively mounted on said axle an operative connection for said drum and said wheel, embodying a driving pin rigidly mounted in one of said members, and a slot to receive said pin, formed in the other of said members, said slot being radial to said members; and a head mounted on said pin to overlie the sides of said slot, to retain said wheel and drum in service relation.

3. In combination; a carrying wheel having a hub and flexible connections therewith; an axle held against rotation; a brake drum continuously concentric with and rotatively mounted on said axle an operative connection for said drum and said wheel, embodying a driving pin rigidly mounted in one of said members, and a slot to receive said pin, formed in the other of said members, said slot being radial to said members; a head mounted on said pin to overlie the sides of said slot, to retain said wheel and drum in service relation; and a power transmission wheel mounted on said drum.

4. In combination; a traction wheel having a hub and resilient connections therewith; an axle mounted in said hub; a facing for said wheel; a reinforcement for said facing; a pin rigidly mounted in said facing and reinforcement to extend outward from said wheel; and a brake drum rotatively mounted on said axle, said drum having a facing adapted for disposition in service parallel to the facing of said wheel, the facing of said drum being radially slotted to receive said pin.

In testimony whereof I have signed my name to this specification in the presence of two subscribing witnesses.

NOAH CORNFIELD.

Witnesses:
 E. F. MURDOCK,
 PHILIP D. ROLLHAUS.